Oct. 29, 1935.  E. D. EBY  2,019,342

JOINT

Filed April 13, 1932

Inventor:
Eugene D. Eby,
by Charles E. Tullar
His Attorney.

Patented Oct. 29, 1935

2,019,342

UNITED STATES PATENT OFFICE 2,019,342

JOINT

Eugene D. Eby, Pittsfield, Mass., assignor to General Electric Company, a corporation of New York Application April 13, 1932, Serial No. 604,996

5 Claims. (Cl. 285—115)

In the manufacture of high tension electrical apparatus using fluid as an insulating material, it is often necessary to make fluid tight joints between a metal part and a part made of organic insulating material, for example, a paper tube impregnated with a hardened binder. Where the parts are of such a character that bolting flanges and gaskets may be employed for effecting such a joint, no particular difficulty is experienced. On the other hand, where flanges and gaskets cannot be used owing to the lack of available space or because they are objectionable for electrical reasons, the problem is a difficult one. This is especially true where it is desired to effect a fluid tight joint of relatively small area, and where due to unequal expansion and contraction of the connected parts there is a tendency for them to separate and thus permit leakage of the insulating fluid, as in a fluid stop joint for power cables.

My invention has for its object the provision of an improved joint for uniting metal and organic insulator parts, especially those joints where strength in the union and fluid tightness are of paramount importance.

A further object of my invention is the provision of an improved method of making joints.

For a consideration of what I believe to be novel and my invention, attention is directed to the accompanying description and the claims appended thereto.

Figure 1:
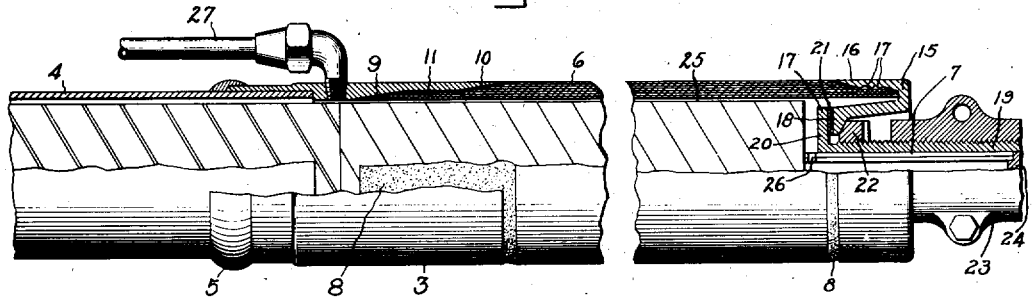
Figure 2:

In the accompanying drawing, Fig. 1 illustrates a part of a cable joint and Fig. 2 a sectional view of a wiping sleeve on an enlarged scale.

I have elected to described my invention in connection with a cable joint having a metallic sleeve such as brass and an insulating tube of organic material such as paper impregnated with a hardened binder such as a phenolic condensation product or its equivalent as my improvement is of particular value in connection therewith. In such constructions the sleeve and tube also serve to confine a body of fluid insulation, such as thin oil, and are subjected to unequal expansion and contraction due to temperature changes, and also to substantial strains exerted in a longitudinal direction tending to break the joint between them wholly or in part and permit leakage of the fluid insulation.

By reason of the method of treatment hereinafter set forth, I have achieved the remarkable result of rigidly uniting by a fluid tight joint an organic material in the form of a tube with a socketed metal part, and this I believe to be broadly new with me.

In the drawing 3 indicates a metal sleeve or element commonly referred to in the cable art as a "wiping sleeve". It is provided with a socket at one end to receive the lead sheath 4 of a cable, and the two parts are united by a wiped soldered joint 5. The opposite end of the sleeve is also provided with a socket, the wall of which diverges or tapers outwardly from its inner end, the purpose of the taper being to provide for the uniform distribution of electrical stresses to which the insulating tube 6 is subjected by reason of the high tension currents in the insulated cable conductor 7. Because simple tapered surfaces, one on the sleeve and the other on the insulating tube 6 would not for the purpose intended afford a sufficiently strong joint, the wall of the socket is so machined that two or more tapered or conical portions 9 and 10 are provided and each two such surfaces are connected by a cylindrical surface 11 which is grooved or roughened at 12. Another reason for using surfaces of the character described is that the metal spray to be referred to later, covers the ends of all or substantially all of the ends of the laminations of the tube instead of being confined to one or two of them which might permit the outer layers to be torn off when subjected to an end pull. In machining or otherwise treating the end of the tube or the surface thereon adapted to receive the spray, care should be exercised to see that said surface is somewhat roughened so as to afford a good anchorage for the spray. The fused metal uniting the parts enters the grooves or other depressions 12 and is therefore subjected to shearing, as distinguished from tension stresses when said parts tend to separate by a longitudinal pull, one with respect to the other. The longitudinal stresses are due to the fact that the sleeve is rigidly secured to the lead sheath and the insulating tube to an end of the insulated conductor located within the sheath, said sheath and conductor having different ratios of expansion when the cable is in service. The insulating tube comprises tightly wrapped concentric turns of paper which paper has been previously impregnated with a hardened binder, such as a phenolic condensation product or its equivalent by the application of heat at the time the paper is wound into tube form. The tube is subjected to a temperature of approximately 150° C. to cure or harden the binder.

The wiping sleeve is machined to the shape shown and the cylindrical surface or part 11 is slightly roughened as stated above. One end of the insulating tube is also machined to the proper size to fit the socket in the wiping sleeve. The tapered and straight diameters of the insulating tube are approximately .002 larger than the inside tapered and straight diameters of the wiping sleeve to allow for a shrink fit between the parts. After being machined the tapered end of the organic insulating tube is sprayed with fine hot particles of metal, as melted copper for example, as indicated by reference character 8. In this spraying operation care must be exercised not to injure the organic material of the tube which may easily be done if the metal is too hot. The metal used in the spraying operation should however be hot enough to cause very fine sub-division thereof and be under sufficient pressure to ensure that the particles of the spray are well embedded in the surface of the tube. My experience is that the copper when it strikes the tube should have a temperature of approximately 60° C. The end of the tube so sprayed and also the wall of the socket in the sleeve are then tinned with a fusible alloy at a temperature of the order of 200° C. In tinning the sprayed end of a tube made of organic material care should be exercised not to overheat the tube and thus injure it. In practice the tinning is accomplished in less than a minute. After tinning, the metal sleeve is heated in a suitable furnace to cause it to expand, and for this purpose it may be subjected to a temperature of the order of 350° C., and while so heated is pressed on the end or other sprayed part of the insulating tube and allowed to cool. This causes the metal part having the type of fit mentioned above on cooling to make a shrink fit on the insulating tube. The temperature of the metal part or sleeve is such that it causes the alloy on the meeting surfaces of the sleeve and tube to fuse and form a strong mechanical and oil tight joint.

Tests on joints made in the manner described show remarkable strength as well as being fluid tight. For example, actual test of a joint having a three and one-half inch tube required 7200 pounds pull to break the joint between the sleeve and tube. Joints have been tested under 30 pounds air pressure for 820 hours without leaking, and while under test were subjected to over 85 temperature cycles between room temperature and 110° C.

The right hand end of the tube 6 is machined to form a taper and thereafter is sprayed with copper 8, in the manner previously described. It is seated in and fused to an annular member 15 having a peripheral portion 16 which encloses one end of the tube and is provided with grooves or depressions 17 to receive the fused metal. The method of uniting the tube and member is the same as that previously described. The member is provided with an internal shoulder 18 having a flat face on one side and a beveled face on the other. Surrounding the strands of the conductor and soldered thereto is a sleeve 19 having an end flange 20, the body of the sleeve being externally screw-threaded. Between the flange and the flat face of the member is located a gasket 21 held under compression by a nut 22 acting on the beveled face of the shoulder 18. Surrounding the sleeve and clamped thereto by screws is a connector 23, the other half of the connector being similarly connected to the other cable length. To prevent the passage of fluid, such as thin oil, from the channel of one cable length to that of the other connected length, a plug 24 is provided and soldered in place. To permit oil to pass from the conductor channel into the space 25 between the tube 6 and the insulation on the conductor one or more radial ports 26 are provided. The other half of the joint is similarly constructed and therefore further description is unnecessary. For simplicity of illustration, the overall insulation of the completed joint, as well as the fluid enclosing casing around the joint, have been omitted but it is to be understood that I may use any of the well known means for the purpose.

Although I have illustrated one half of a fluid stop joint, the same may be considered as a part of an end terminal or bushing in which case the part 23 may be regarded as the part to which the line or other conductor is connected. 27 indicates a tube through which insulating fluid may enter or pass from the cable into a reservoir.

What I claim as new and desire to secure by Letters Patent of the United States, is:—

1. A joint of the character described comprising a laminated organic member of tubular form, the laminations being exposed at one end of the member, a metallic element also of tubular form having a socket in which the laminated end of the member is located, the socket making a shrink fit with said laminated end, jointing material situated between the wall of the socket and the said end comprising a body of finely divided metal applied directly to and penetrating the laminations to form a bond, and fused metal between the bond and the wall of the socket.

2. A joint of the character described comprising a metallic sleeve having a central socket with an outwardly tapering wall and also a cylindrical portion, the latter serving to improve the anchorage, a tubular member of organic material having a roughened conical end and also a cylindrical part, said conical end and cylindrical part snugly fitting into and filling the socket, a body of finely divided metal applied directly to said end and cylindrical part of the member, parts of which penetrate and are embedded below the surface thereof, fused metal uniting the body with the wall of the socket, and means for supporting the metallic sleeve.

3. A joint of the character described comprising a metallic sleeve having a central socket with an outwardly tapering wall and a cylindrical portion, the latter serving to improve the anchorage, a tubular member comprising concentric layers of paper and a bonding material, said member being cut away at one end to form a cone conforming in size to the wall of the socket with the edges of the laminations exposed, said socket and conical end of the member making a shrink fit, a covering of fused metal applied directly to and penetrating the conical end of the member, other fused metal of lower melting point located between the first mentioned fused metal and the wall of the socket, and supporting means for the outer end of the metallic sleeve and that of the tubular member.

4. A joint of the character described comprising a metallic sleeve having a central socket provided with two cone shaped portions diverging toward the outer end thereof and a cylindrical portion located between the cones, a tubular member of laminated organic material and a binder, one end of the member having roughened surfaces complementary to those of the socket and filling the same, and a means for uniting the roughened surfaces of the member with the wall of the socket comprising a body of finely divided metal embedded in the roughened end of the member and fused metal uniting the metal body and the wall of the socket.

5. A joint of the character described comprising a metallic sleeve having a socket at one end, the wall of which defines a pair of spaced cones diverging outwardly with a cylindrical part between the cones, said cylindrical part having a roughened portion, a tubular member of organic material having an end complementary in shape and size to the socket, the socket wall making a shrink fit therewith, said roughened portion of the socket assisting to prevent endwise separation of the united parts, a body of finely divided metal embedded in that portion of the tubular member which enters the socket, and fused metal uniting the embedded metal and the wall of the socket.

EUGENE D. EBY.